Patented Dec. 24, 1940

2,225,815

UNITED STATES PATENT OFFICE 2,225,815

METHOD OF LUBRICATING BEARINGS OPERATING AT HIGH TEMPERATURES

Howard A. Acheson, Port Huron, Mich., assignor, by mesne assignments, to Acheson Colloids Corporation, Port Huron, Mich., a corporation of Michigan No Drawing. Application September 2, 1938, Serial No. 228,214

1 Claim. (Cl. 252—29)

This invention relates to the lubrication of machines and machine elements which normally are subjected to high temperatures at which the customary oil and grease lubricants would be vaporized or decomposed. The invention is more particularly concerned with the lubrication of the conveyors, bearings etc. used in ovens or furnaces such as annealing oven conveyors, oven car journals, baking oven conveyors, enameling ovens and the like. Still more particularly the invention is concerned with the lubrication of the parts of machines which are subjected to high temperatures and in which objectionable fumes or gases produced by the vaporization of the lubricant or its vehicle and solid deposits which might drop off of the machine into the material being treated must be avoided. These conditions are encountered for instance in baking ovens in which either fumes or solid deposits might damage the food product. Another instance in which the avoidance of objectionable by-products of lubrication is desirable and to which the present invention is applicable is in the lubrication of steam engine cylinders, which are subjected to high temperatures, operating under superheat.

Heretofore it has been proposed to provide a lubricant consisting of a liquid vehicle capable of evaporating cleanly at the temperature of the furnace and a solid lubricant such as powdered graphite or mica. In this combination the liquid vehicle is supposed to serve to convey the solid lubricant to the parts to be lubricated and then to evaporate without leaving any resinous or gummy deposit and without creating any gas or vapor which is harmful to the article being treated, e. g., bread. The solid lubricant is supposed to be carried into contact with the surfaces to be lubricated. It has been found, however, that a liquid vehicle of sufficient volatility for the purpose will not hold the flake or powdered graphite or mica in suspension long enough to secure a good penetration thereof into the bearings to be lubricated. Contributing to this result, of course, is the fact that powdered or flake graphite or mica tend to settle quite rapidly in a light liquid vehicle and moreover the particles are too large to be carried into the spaces where lubrication is required. It has been found, for instance, that the commercial grade of finely divided graphite will remain suspended in a suitable refined petroleum product serving as the liquid vehicle for not more than about 10 minutes. In the use of such a composition it must be thoroughly agitated before it is applied and even then apparently the graphite does not penetrate the bearings and remain deposited on the friction surfaces to provide a lasting lubrication thereof. Consequently, frequent applications of the lubricant composition are required resulting in a rapid building up of objectionable deposits, which effect is aggravated by the fact that fairly concentrated mixtures of the solid lubricant, e. g., from 2 or 3 pounds of graphite up to a quantity at which the mixture becomes too thick to penetrate, per gallon of vehicle are used.

Colloidal graphite lubricants heretofore available have offered some advantages over the powdered graphite lubricant referred to above, particularly with respect to better suspension in the vehicle and better penetration, but such colloidal graphite as has been available heretofore has shown a tendency to flocculate and settle when suspended in light volatile vehicles and the use of other vehicles designed to prevent flocculation and improve the suspension of the graphite has been found to be objectionable in most instances of high temperature lubrication.

Now I have found that by the use of colloidal graphite suspended in a suitable volatile vehicle in which the graphite does not flocculate and which does not create objectionable gases or vapors or leave objectionable deposits, the colloidal graphite being used in relatively minute quantity, e. g., about 0.2% calculated on the weight of the vehicle, all of the difficulties above referred to, encountered in previous attempts to lubricate machine parts which are subjected to high temperatures, are avoided. The lubrication is lasting and the application of the lubricating composition may therefore be infrequent. Due to this fact and the fact that the quantity of graphite applied is very small, objectionable deposits are not formed even after a long period of time and the periodic cleaning of the machine heretofore constituting a part of the lubricating scheme is practically eliminated. The colloidal graphite remains in suspension so that agitation of the composition is unnecessary and failure to do so by a careless workman ceases to be a consideration. The colloidal graphite penetrates wherever the liquid vehicle will penetrate and apparently coats or impregnates the metal bearing surfaces, providing an efficient and lasting lubrication thereof.

As the liquid vehicle I may use the petroleum product designated as Standard Oil Co.'s No. 9 refined oil described in U. S. Patent No. 1,880,987.

The colloidal graphite may be suspended directly in this oil, and, as stated, a concentration of 0.2% has been found to be sufficient, although, as will be apparent, this is not a critical consideration and the concentration of the colloidal graphite in the vehicle may be varied within a wide range. Effective lubrication may be obtained with as little as 0.02% of colloidal graphite and so far as appears concentrations as high as 2% or even higher are unobjectionable excepting that they probably result in wasting the graphite. Some of the lubricating composition inevitably is deposited where it does no good and the more concentrated is the composition the greater is this waste. Increasing concentration of the composition cannot be fully compensated without limit by less frequent application of the lubricant or its use in smaller amounts. The lubricating composition must be applied more or less frequently because the graphite deposit on the bearing surfaces, while lasting, is not permanent and the composition must be applied in sufficient amount to penetrate to the points to be lubricated most distant from the point of application of the composition and the concentration must be sufficient to maintain the lubricant film of graphite on the bearing surfaces. A 0.2% composition applied once a week to baking oven conveyors has been found to be sufficient but it will be apparent that the concentration and frequency of application of the composition will have to be varied to suit the circumstances.

The invention is not limited to the vehicle disclosed in Patent No. 1,880,987 which is cited merely as an example of a suitable vehicle. This vehicle is designed to vaporize at the particular temperature encountered in baking ovens, to leave no residue, to generate no objectionable fumes and to have a sufficiently high boiling point that it does not sizzle when applied. It is obvious that under other conditions the properties of the vehicle may be different. It is of course important under practically all conditions that the vehicle shall not leave any residue or generate objectionable fumes, although what may constitute objectionable deposits or fumes depends upon the circumstances. For example, in the lubrication of a conveyor for annealing glass it is doubtful that either deposits or fumes produced by any otherwise suitable vehicle would be a serious consideration. If circumstances were such as to permit application of the composition to the parts to be lubricated at approximately atmospheric temperature, a much lighter vehicle such as gasoline or benzine or carbon tetrachloride might be used, such vehicle being selected of course with respect to odor, volatility, formation of deposits, penetrating properties and compatibility with the colloidal graphite. The vehicle generally should be of low viscosity so as to have good penetrating properties.

As the solid lubricant, i. e., the colloidal graphite, I prefer to use colloidal graphite such as that described in Patent No. 2,176,879 which, due to its small particle size and its nonflocculating characteristics will remain suspended in light vehicles such as gasoline for long periods of time. The vehicle may, as stated above, be the Standard Oil Co.'s No. 9 refined oil or any other suitably fluid and volatile vehicle. The suspension is quite permanent,—the time required for appreciable settling must be reckoned in days rather than minutes. The vehicle used does not form gummy deposits or objectionable odors and the amount of graphite and associated disintegrating agent and colloid stabilizing agent present in a 0.2% suspension of the graphite in the vehicle is insufficient to produce objectionable deposits thereof in any reasonable use of the composition. On account of the superior lubricating action of the colloidal graphite, the composition containing only about 0.2% of graphite need not be applied any more frequently nor in larger quantity than a composition containing about 25% of noncolloidal finely divided graphite.

The composition of the present invention, as will be seen from the foregoing disclosure, consists of a suitable vehicle which is volatile within the desired temperature range, i. e., capable of carrying the graphite to the parts to be lubricated but sufficiently volatile to completely vaporize at the highest temperature encountered without leaving any substantial residue and without generating any objectionable vapor or gas, and a solid lubricant consisting of colloidal graphite which remains in suspension in the vehicle without flocculation, and penetrates and adheres to all of the surfaces requiring lubrication and thus provides efficient lubrication while being present in such small amount that objectionable deposits are not formed on the machine being lubricated within any reasonable period of use.

I claim:

Method of lubricating bearings and the like which normally are subjected to temperatures at which lubricating oils and greases are vaporized or decomposed which comprises applying to such bearings a composition consisting essentially of a low viscosity organic vehicle and 0.02 to 2% of colloidal graphite which does not flocculate in said organic vehicle, said composition being applied to the bearing while the latter is at a temperature below the boiling point of the vehicle and said vehicle being capable of vaporizing completely at the highest temperature to which the bearing normally is subjected without leaving any substantial solid residue, the amount of said composition applied being sufficient to penetrate to and coat the metal bearing surfaces with a lubricant film of graphite but insufficient to form an objectionable deposit thereon.

HOWARD A. ACHESON.